US 6,575,662 B2

(12) United States Patent
French

(10) Patent No.: US 6,575,662 B2
(45) Date of Patent: Jun. 10, 2003

(54) WATER QUALITY MANAGEMENT SYSTEM AND METHOD

(75) Inventor: Bruce J. French, Tallahassee, FL (US)

(73) Assignee: Gannett Fleming, Inc., Camp Hill, PA (US)

(*) Notice: Subject to any disclaimer, the term of this patent is extended or adjusted under 35 U.S.C. 154(b) by 0 days.

(21) Appl. No.: 09/910,704

(22) Filed: Jul. 20, 2001

(65) Prior Publication Data

US 2002/0031402 A1 Mar. 14, 2002

Related U.S. Application Data

(60) Provisional application No. 60/219,877, filed on Jul. 21, 2000.

(51) Int. Cl.[7] ............................................. E02B 3/00
(52) U.S. Cl. ......................... 405/80; 405/40; 405/78; 405/107; 405/124; 210/170; 210/747
(58) Field of Search ............................. 405/39, 40, 41, 405/43, 52, 80, 83, 88, 78, 92, 107, 124–127; 210/170, 747; 137/236.1

(56) References Cited

U.S. PATENT DOCUMENTS

| 833,544 | A | | 10/1906 | Parker | |
|---|---|---|---|---|---|
| 1,281,008 | A | | 10/1918 | Howard | |
| 2,361,231 | A | * | 10/1944 | Nebolsine | ................ 210/170 |
| 3,473,509 | A | | 10/1969 | Miyamura | |
| 3,492,822 | A | | 2/1970 | Josephs | |
| 3,555,829 | A | * | 1/1971 | Trewhella | ................ 405/88 X |
| 3,733,830 | A | | 5/1973 | Jacobs | |
| 3,803,851 | A | * | 4/1974 | Soileau | ................ 405/40 |

(List continued on next page.)

FOREIGN PATENT DOCUMENTS

| DE | 851774 | | 10/1952 | |
|---|---|---|---|---|
| JP | 6124713 | * | 2/1986 | ............ 405/80 |
| SU | 1308698 A1 | | 5/1987 | |

OTHER PUBLICATIONS

Letter dated Sep. 28, 1992 from Northwest Florida Water Management District including 16 sheets of drawings and two sheets of responses to questions—total 19 sheets, Sep. 1992.
Memorandum from Ken Jones to Philip Cook, City Manager, City of Destin, Jan. 6, 1993—6 pages regarding pumping facility, Jan. 1993.

Primary Examiner—Jong-Suk (James) Lee
(74) Attorney, Agent, or Firm—Kramer Levin Naftalis & Frankel LLP

(57) ABSTRACT

A water quality management system and method that controls the exchange of water between two bodies of water (e.g., estuary and ocean) separated by at least one land barrier. The system consists of a series of water exchange units that are disposed in the estuary and knowledge-linked into a water quality management system that is remotely controlled from a central location. Each water exchange unit may comprise a conduit extending through the land barrier having a terminal end on the ocean side and a terminal end on the estuary side. The exchange of water between the ocean and estuary through the conduit may be effected using reversible pumps connected to the terminal end of the conduit on the estuary side. The pumps are preferably controlled from a remote location based on feed back data received from sensors located both in the estuary and ocean. The sensor data, which may include data on fresh water falls to the estuary, rain fall, tide cycles, salinity, temperature and turbidity are processed to control the pumps to maintain the water content in the estuary at desired levels for marine life to flourish.

55 Claims, 4 Drawing Sheets

U.S. PATENT DOCUMENTS

| | | | |
|---|---|---|---|
| 3,863,605 A | | 2/1975 | Gallup |
| 4,091,624 A | * | 5/1978 | Steinke .......................... 405/96 |
| 4,162,864 A | | 7/1979 | Maeda et al. |
| 4,348,158 A | * | 9/1982 | Wood .......................... 417/40 |
| 4,364,228 A | * | 12/1982 | Eller .......................... 405/78 X |
| 4,645,377 A | * | 2/1987 | Vesterby ...................... 405/74 |
| 4,865,526 A | * | 9/1989 | Clark et al. .................. 417/360 |
| 5,336,018 A | | 8/1994 | Maudal |
| 5,672,028 A | | 9/1997 | Mehta |
| 5,829,917 A | * | 11/1998 | Maudal ........................ 405/52 |
| 6,089,790 A | * | 7/2000 | Berry, III et al. ............ 405/127 |
| 6,095,719 A | * | 8/2000 | Miya et al. .................. 405/127 |
| 6,173,727 B1 | * | 1/2001 | Davey ........................... 137/1 |
| 6,213,684 B1 | * | 4/2001 | Fowler et al. ............ 405/87 X |

\* cited by examiner

WATER QUALITY MANAGEMENT SYSTEM AND METHOD

RELATED APPLICATION DATA

This Application claims priority from previously filed U.S. Provisional Patent Application No. 60/219,877 filed on Jul. 21, 2000, the disclosure of which is incorporated by reference in its entirety.

BACKGROUND OF THE INVENTION

The present invention is generally directed to a water quality management system and method and more particularly to a water quality management system and method of adjusting and maintaining the water content in an estuary, marina, harbor or embayment by automatically controlling bi-directional flow of water into and out of the estuary or embayment to provide a well balanced ecosystem that supports the prosperous growth of plants, plankton and marine life.

Estuaries (or lagoons) developed over eons and their hydrologic relationship between land and ocean were in a state of variable equilibrium with regards to the influence of freshwater inflow and nutrient cycling. Over time, river-transported sand conveyed by long-shore ocean currents formed barrier islands. Natural inlets were established as the water head in the estuaries sought an outlet to the ocean. These natural inlets served to adequately preserve this hydrologic relationship carrying ocean water into the estuaries and carrying mixed water (fresh water and sea water) out to the ocean.

Estuaries are habitats or nurseries for many of the planet's marine life and play an integral role in the marine food web. At the same time, estuaries (or lagoons) are in high demand as recreational centers and have high-value, waterfront real estate concerns. Man's influence in this coastal zone has disrupted the hydrologic balance by sending too much freshwater runoff into the estuaries, causing the natural system to deteriorate over time, thereby detrimentally affecting these habitats and the marine life contained therein. Indeed, declining oceanic stocks have been recently recognized by the White House and Congress as a national priority topic. The "year of the oceans" is being revived and, both oceans and restoration of estuaries will soon be receiving great attention from federal, state and local governments. In one example, the federal government and State of Florida have earmarked over $7 Billion for the Florida Everglades Restoration Initiative. The National Estuaries Program is yet another large example that governments are taking serious action to improve our coastal marine habitats.

To restore balance to these marine habitats so marine life can flourish requires either reducing freshwater inflows and/or increasing seawater influx to the estuary. Since changing human habitat conditions is difficult and very expensive, reducing freshwater inflow does not appear to be a viable option. Cutting new inlet channels would be a feasible solution were it not for dense residential developments existing on the national barrier islands. Additionally, federal and state governments are strongly opposed to creating man-made inlets as they disrupt long-shore sand transport, cause erosion on the down-current side of the inlet and generally create an expensive maintenance program.

Accordingly, a need exists for a water quality management system and method for regulating the influx of sea water into an estuary and indeed any land-locked body of water (e.g., marina, harbor or embayment). A further need exists for such a system that may be remotely controlled and automated to provide instantaneous control over the influx of sea water and if necessary outflow of fresh water to maintain an equilibrium between fresh water and sea water for marine life to flourish within an estuary.

SUMMARY OF THE INVENTION

The present invention is generally directed to a water quality management system and method that controls the exchange of water between two bodies of water separated by at least one land barrier. In an exemplary embodiment, an estuary or embayment is one body of water and the other body of water is the ocean. The system consists of one or a series of water exchange units that are disposed in the estuary or embayment and knowledge-linked into a water quality management system that is remotely controlled from a central location. Each water exchange unit may comprise a conduit extending through the land barrier having a terminal end on the ocean side and a terminal end on the estuary side. The exchange of water between the ocean and estuary through the conduit may be effected using reversible pumps connected to the terminal end of the conduit on the estuary side.

The pumps are preferably controlled from a remote location based on feed back data received from sensors located both in the estuary and ocean. The sensor data, which may include data on rain fall, tide cycles, salinity, temperature and turbidity are processed to control the pumps to maintain the water content in the estuary or embayment at desired levels. That is, ocean water may be pumped into the estuary or embayment and/or estuary or embayment water pumped into the ocean, as necessary, to maintain the water content of the estuary or embayment at desired levels for marine life to flourish.

Accordingly, it is an object of the present invention to provide a water quality management system and method for regulating the influx of sea water into an estuary and indeed any land-locked body of water (e.g., marina, harbor or embayment).

It is a further object of the present invention is to provide such a system including water exchange units that may be remotely controlled and automated to provide instantaneous control over the influx of sea water and if necessary outflow of fresh water to maintain an equilibrium between fresh water and sea water for marine life to flourish within an estuary.

It is another object of the invention to provide a method for exchanging water between to bodies of water separated by a barrier.

It is still a further object of the present invention to provide such a method including the step of installing a water passage means (e.g., conduit) using HDD or combinations of HDD and open-cut trench techniques.

Still other objects and advantages of the invention will in part be obvious and will in part be apparent from the specification.

The invention accordingly comprises the several steps and the relation of one or more of such steps with respect to each of the others, and the system embodying features of construction, combination of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description, taken in connection with the accompanying drawings, in which.

DESCRIPTION OF THE EXEMPLARY EMBODIMENTS

Figure 1:
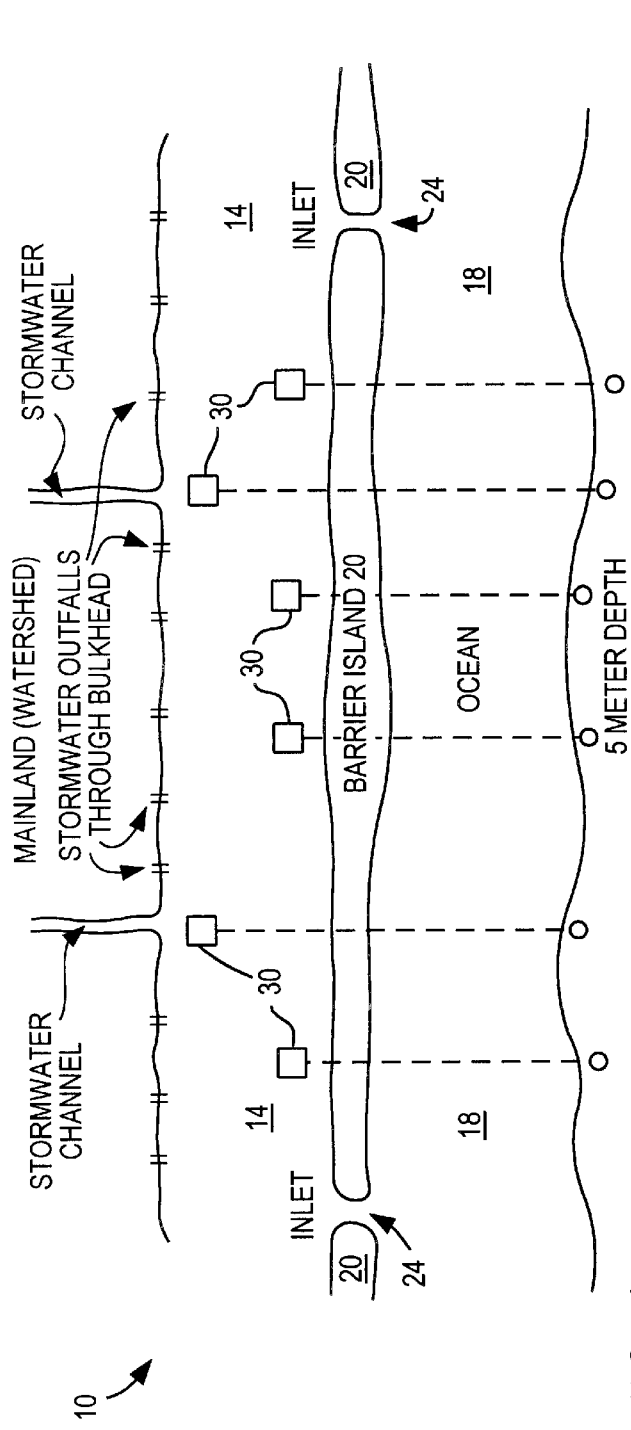
FIG. 1 depicts a water quality management system for managing the water content of a first body of water (e.g., estuary) substantially separated from a second body of water (e.g., ocean) by a land barrier according to an exemplary embodiment of the invention.
Figure 2:
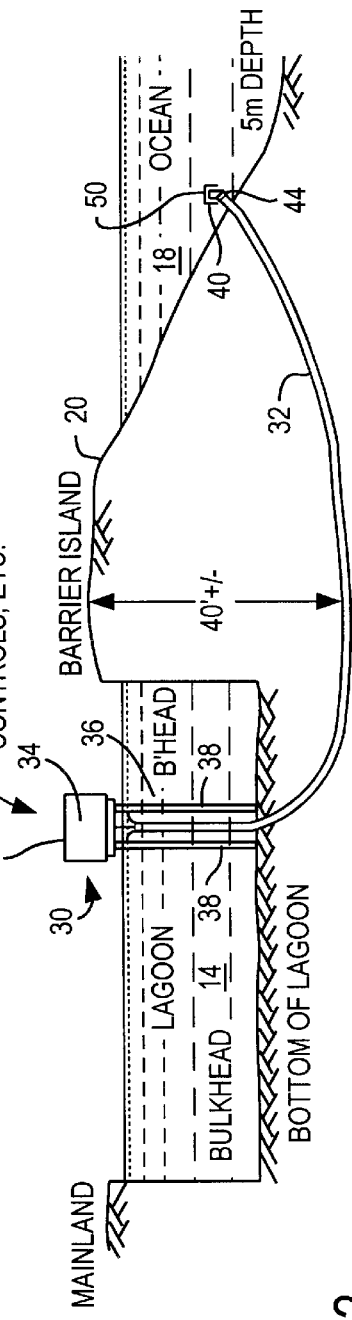
FIG. 2 depicts a water exchange unit according to an exemplary embodiment of the present invention.

Referring to the FIGS. 1 and 2, and in particular FIG. 1, a water quality management system is generally depicted at 10. A first body of water 14 (e.g., estuary, lagoon or embayment) is shown separated from the ocean 18 by a barrier island 20. The barrier island 20 includes a plurality of inlets 24 that permit ocean water to enter the body of water 14 under the influence of natural tidal forces.

According to an exemplary embodiment of the present invention, the water quality management system 10 comprises a plurality of individual water exchange units 30 disposed within the body of water 14 at predetermined intervals. As shown in FIG. 2, a conduit 32 is installed at some depth under and through the barrier island 20, having respective terminal ends exiting in body of water 14 and ocean 18 for exchanging water between the first and second bodies of water. The terminal end of the conduit is preferably located in the body of water 14 at a low tide depth contour of 3 feet.

The water exchange unit 30 comprises a pump assembly 34 attached to one end of the conduit 32 within the protected body of water 14 to minimize wave, storm and vessel-impact damages. The pump assembly 34 may be completely submerged during the high tide stage. The pump assembly 34 is preferably a reversible pump to move water in either direction through the conduit 32. Pump assembly 34 may be selected from one of several pump designs, including a retractable pump unit, fixed pump unit and land based, fixed pump station. The water exchange unit may operate in a passive mode to allow bi-directional flow by natural tide cycles.

1. Retractable Pump Unit

In the case of a retractable pump unit, a vertical caisson (e.g., pump house) is positioned around the conduit 32 and driven into the sediments of the body of water 14; the interior sediments are to be excavated. A vertical riser is attached to the conduit 32 inside the caisson. A low-head, high-volume pump unit may consist of a 90 degrees elbow, drive shaft, impeller, bearing supports/guides and an electric or hydraulic drive motor slips onto the vertical riser as a sleeve. Gaskets between the riser and pump fitting/sleeve prevent backflow of water out the sleeve. A flange is located at the base of the sleeve section and features cogs around the circumference to permit horizontal rotation of the discharge/intake pipe within a range of 360 degrees. The anchored caisson provides support to the retractable pump unit and vertical riser during operation. Other pump unit configurations may be considered to effect operational performance.

In an exemplary embodiment, the bottom side of the horizontal section of the pump unit elbow is positioned at, for example, 12 inches above the sea floor. A concrete pad with a radius of, for example, 20 feet surrounds the vertical caisson and serves to eliminate scouring during operations. Concrete rubble riprap may extend beyond the pad. For example, the rubble riprap may extend to a radius of fifty feet for 360 degrees.

The retractable pump unit may be removed from the vertical riser by means of a lift crane with electric winch. The crane is permanently fixed to an adjacent support platform. This feature facilitates pump and conduit repair and permits the frequent, routine insertion of a pipe cleaning pig.

Figure 3:
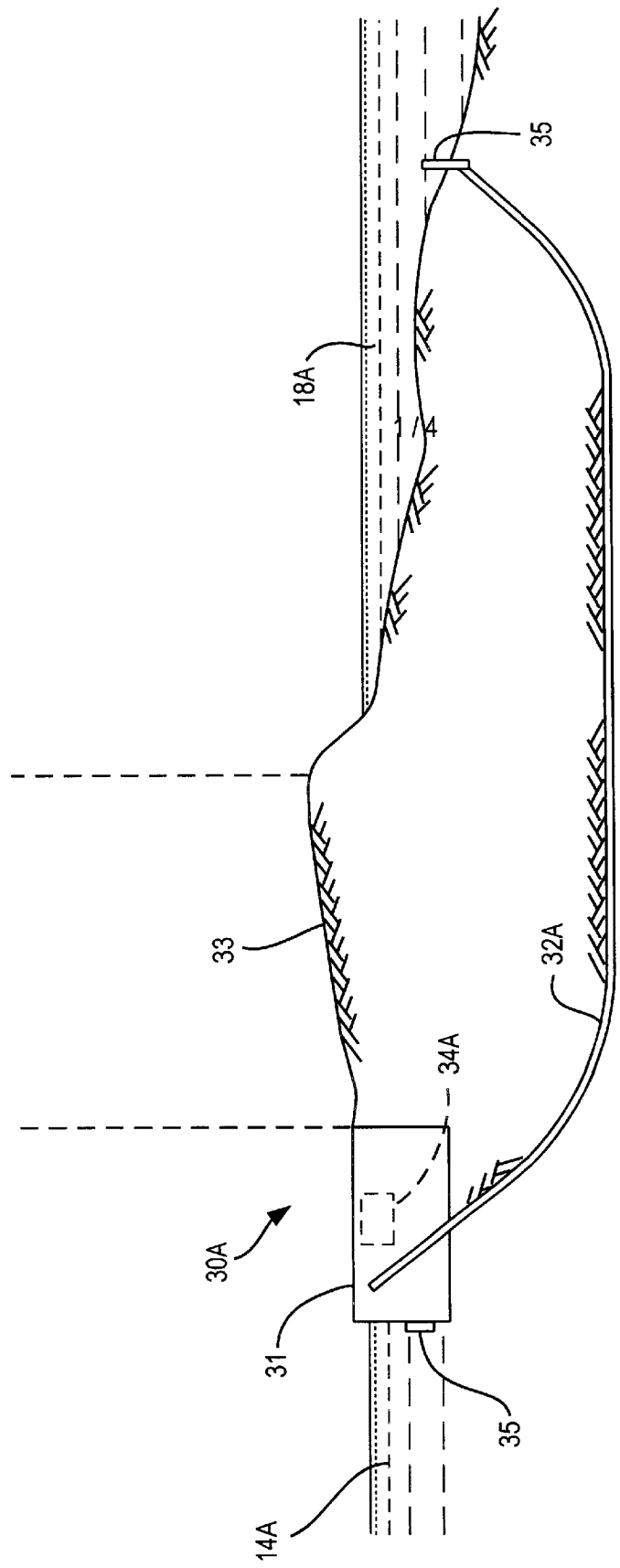
FIG. 3 depicts a water exchange system according to an exemplary embodiment of the present invention wherein the water exchange unit comprises a pump house.

Referring to FIG. 3, a water quality management system is depicted wherein a water exchange unit 30A is comprised of pump house 31 housing a pump unit 34A. As shown, the pump house 31 is at least partly submerged within a first body of water 14A (e.g., lagoon or estuary). The pump house 31 is connected by a conveyance conduit 32A that runs through the land barrier 33 out into a second body of water 18A (e.g., ocean). As discussed above, the pump unit 34A (e.g., reversible pump) may be connected to the conduit 32A utilizing various configurations of risers and pipe segments to convey water between bodies of water 14A and 18A through intake/discharge ends 35, 35. The intake/discharge end 35 located within the first body of water may be a 90 degrees elbow as discussed above or include a diffuser having a plurality of risers, as discussed below. Similar configurations may be employed for the intake/discharge end 35 within the second body of water.

2. Fixed Pump Unit

Alternatively a fixed pump unit may be used to pump water through conduit 32. Selection of a fixed pump unit requires mounting an electric or hydraulic pump motor inside an equipment shed fitted to a rigid, raised support platform. A drive shaft is provided that extends downwardly from the motor through a bearing-mounted guide hole in the discharge/intake fitting attached to the conduit 32. Elevations of the pipe elbow attachment are the same as specified for the retractable pump unit. An impeller is located below the sea floor level for minimizing cavitation during high RPMs. The horizontal section of the elbow should be mounted to rotate within a range of 100 degrees. Alternatively, a centrifugal pump configuration may be employed to effect operational performance.

A mesh cradle may be attached to the elbow in order to facilitate the insertion of a pipe cleaning pig. The pig can be berthed and launched without interfering with the drive shaft and impeller.

3. Land-based, Fixed Pump Station

In some cases it may be possible to terminate/start the conduit crossing on land adjacent to the lagoon. This option may permit the construction of a typical low lift, high volume pumping station with a horizontal pipe extending out into the lagoon waters, positioned so as to be submerged at low tide.

Regardless of the pump design selected, a significant demand for energy is required to drive the pumps. Due to the high demand for energy and the need for quiet operation, the preferred pump power supply is a fuel cell operated by natural gas or methanol. This power supply eliminates the need for underwater electric cables and avoids the environmental constraints related to petroleum storage systems. Energy efficiency is significantly increased as compared to standard electric transmission and internal combustion engines.

Referring now to FIG. 2, when a retractable pump unit or fixed pump unit is used, a support platform shown generally at 36 is constructed to support the pump unit. The platform 36 may be either adjacent to or, as shown in FIG. 2, directly above the conduit 32. The platform 36 is preferably constructed of preformed concrete with vertical pilings 38. The base of the platform 36 is set at an elevation of 6 feet above spring high tide.

An equipment shed 39 is provided that is either a prefabricated, skid mounted enclosure or a field-erected structure fixed to the support platform 36. The equipment shed 39 houses the fuel tank, fuel cell, control panel, computer management system and telemetry devices (not shown). Optionally, the pump unit may be housed in the equipment shed 39 and the impeller drive shaft passes through the floor of the platform.

The platform 36 is preferably constructed with terraced ledges that support artificial trees to aid in camouflaging the entire structure down to the water line. Other architectural designs may be employed to disguise the structure or conform to local building codes. The structure is surrounded with marker buoys at 100 foot radius to establish a "no-entry"/"no-fishing" safety zone. Photo-electric marker lights are fitted to the fixed platform to aid navigation and prevent collision. A radar-activated proximity warning horn and recorded voice playback or telecommunications speakerphone may be installed for additional security. Radar data also provides vessel location at a distance of five miles. A surveillance camera is mounted on top of the equipment shed providing 360-degree coverage.

Sensor arrays featuring probes for tide height, salinity, conductivity, turbidity and temperature are attached to the platform 36. The sensor array may be directly mounted to one of the pilings 38. The sensor array is hard-wired to the computer management system housed in the shed 39 for data transmission to the remotely located central control operations. Also, a small weather station with sensors for collecting wind speed, temperature, humidity, solar radiation, and rainfall data may be attached to the equipment shed roof and the data transmitted by wire to the computer management system. Water flow through the conduit is monitored both by the pump motor RPM and via a flow meter attached to the terminal elbow pipe fitting.

Data from sensor arrays located on the platform 36 and/or in telemetry zones throughout the body of water 14 and ocean 18 are transmitted by radio frequency or by wire either continuously or at preset time intervals to their respective receiving terminal. Data are stored for periodic uploading to a remote central computer control station. Two-way data transfer communication can be accomplished by digital cellular telephone equipment and Internet interface.

The data captured by the sensor arrays and transmitted over land-lines or wirelessly using cellular communications to the remote central control station (not shown) controls the operations of all the water exchange units 30. More specifically, pump operation may be remotely controlled by a computer software program that integrates tide cycles, salinity, temperature and turbidity data for variable setting of the unit flow rate and direction of intake/discharge through the conduit 32. In addition, since natural tidal flows can be advantageously used, the units 30 may be programmed to enter a passive, neutral mode to operate as a mini-inlet with ebb and flood flows directly actuated by natural tidal rhythms. During extreme ocean wave heights, the conduit may be closed on the ocean-side to minimize sedimentation collecting within the conduit.

A systems manager is able to control operations of the water exchange units 30 and other system components via the central control station, via Internet access and via telephone. The present system includes critical data alarms that are preset to automatically notify the human systems manager. Key components of remote control include: closing of ocean structure during high wave periods to prevent damage and sediment entrainment; regulation of variable pump speed to control flow velocity; regulation of pump operation time period to control discharge and intake volumes; regulation of lagoon-side horizontal directional discharge of ocean-intake waters; insertion and berthing of the pipe cleaning pig (described in more detail below); initiating refueling delivery orders to the subcontracted energy provider; notifying security personnel, policing agencies or maintenance contractors of intrusions or catastrophic events and service maintenance tasks; changing directions and zoom focal length of the security camera; and broadcasting verbal warnings to trespassers.

As further shown in FIG. 2, at the opposite end or ocean side, the conduit 32 exits at a low tide water depth of not less than 15 feet. This specification generally lies beyond the surf zone for a wave height of less than 10 feet, which is believed to represent the ocean wave condition during 90 percent of the year. Under these conditions, it is assumed that suspended sediments will be marginal due to minimal turbulence from small wave heights passing overhead of the structure.

A riser 40, preferably of the same diameter as the conduit 32, is attached to the conduit 32 by a shear coupling 44. The shear coupling 44 preferably has a shear strength of approximately 70 percent that of the conduit 32 to prevent damage to the conduit 32 in the event of a vessel collision. The riser 40 extends above the ocean floor to a total height of not less than 5 feet and terminates as an open pipe. At this elevation, ocean intake will minimize entrainment of bottom sediments and, thereby, aid in maintenance of the conduit.

Alternatively, one or both terminal ends may consist of a diffuser pipe or conduit that extends substantially parallel relative to the coastline or substantially perpendicular to the conduit. The diffuser pipe together with the conveyance conduit forms a generally T-shaped structure. The diffuser pipe may be equipped with a plurality of risers, as previously described, spaced along the length of the diffuser pipe. In order to ensure even flow throughout the length of the diffuser pipe through the risers or other openings, the diffuser pipe may be constructed to have a stepped configuration along its length. For example, the diffuser may narrow in diameter along its length in the direction of the terminal ends of the diffuser pipe.

Additionally, since cyclic migration of sand both landward and seaward frequently changes the seafloor elevation in the near-shore zone, the vertical riser 40 height should be set sufficiently high so as to preclude being buried by sand movements. A straight, short vertical riser 40 also presents minimal surface area to long shore currents and wave action forces thereby minimizing vibrational movement of the riser 40 and conduit 32. If a diffuser is used, the vertical risers extending from the diffuser should also be set sufficiently high so as to preclude being buried by sand movements. Typically, the diffuser is buried within the sand while the riser extends upwardly a sufficient height to account for known or quantifiable native sand migration patterns.

Although not shown, a sensor wire connects the vertical riser 40 and conduit 32. Upon separation of the riser 40 and conduit 32, the sensor wire is broken, causing an alarm to activate and the pump assembly 36 to deactivate. In such case, maintenance is automatically notified by the computer management system.

As shown further in FIG. 2, the vertical riser 40 is surrounded by a protective enclosure 50. In the exemplary embodiment, the protective enclosure 50 is formed as a cylindrical cage of a marine-grade metal mesh (preferably a 4"×4" min.) that encloses the vertical riser 40. The alloy selected should resist corrosion and minimize marine organism fouling. The enclosure 50 is supported on short concrete stanchions (not shown) located at intervals around the circumference of the riser 40. As a safety feature, the diameter and height of the enclosure 50 is designed so as to have a cross-sectional flow velocity of not more than 0.5 feet per second during maximum pumping conditions. The bottom of the enclosure 50 is positioned at two to three feet above the sea floor to minimize sediment deposition as a result of reduced velocities of ocean currents in the vicinity of the structure and to provide normal sand transport through the area. The enclosure 50 is preferably easily detachable from the supports to facilitate cleaning and replacement.

A cone-shaped flow spreader (not shown) can be positioned approximately two feet above the opening of the vertical riser 40. This attachment aids in reducing exit velocities and aids in dispersal and dilution of discharge waters. The cone attachment can also serve as a terminal stop for a pipe cleaning pig employed in routine maintenance of the conduit.

A marker buoy is preferably screw-anchored approximately 10 to 20 feet from the center of the vertical riser 40. The buoy chain is mounted to avoid impact with the enclosure 50 surrounding the vertical riser 40 during heavy seas. Attached to the buoy anchor chain at 5 feet above the sea floor is a sensor array and data logger with battery power pack. The array consists of probes for sampling ocean salinity, conductivity, temperature and turbidity. Preferably, a small, secondary, submerged buoy is used to support the array. Attached to the top of the buoy is a flashing light and transmitter antenna. The chain may be copper plated to prevent bio-fouling. Both, buoy and array, can be quick-released from the seafloor anchor to facilitate cleaning, servicing and replacement.

In an exemplary embodiment the conduits 32 and 32A are installed using horizontal directional drilling ("HDD"). The HDD process allows large-bore conduits to be run through a barrier island with terminal ends in body of water 14 and beyond the surf zone of ocean 18. In this manner, most of the regulatory and environmental obstacles may be overcome. HDD operations that can be based on land could conceivably link up multiple individual runs each about 5,000 feet in length with a water exchange unit 30 at each internode for any desired total length. Casings could then be either pushed or pulled through each borehole. The terminal intake/discharge end would then be limited to a maximum distance of about 4,500 feet from the shoreline.

Figure 4:
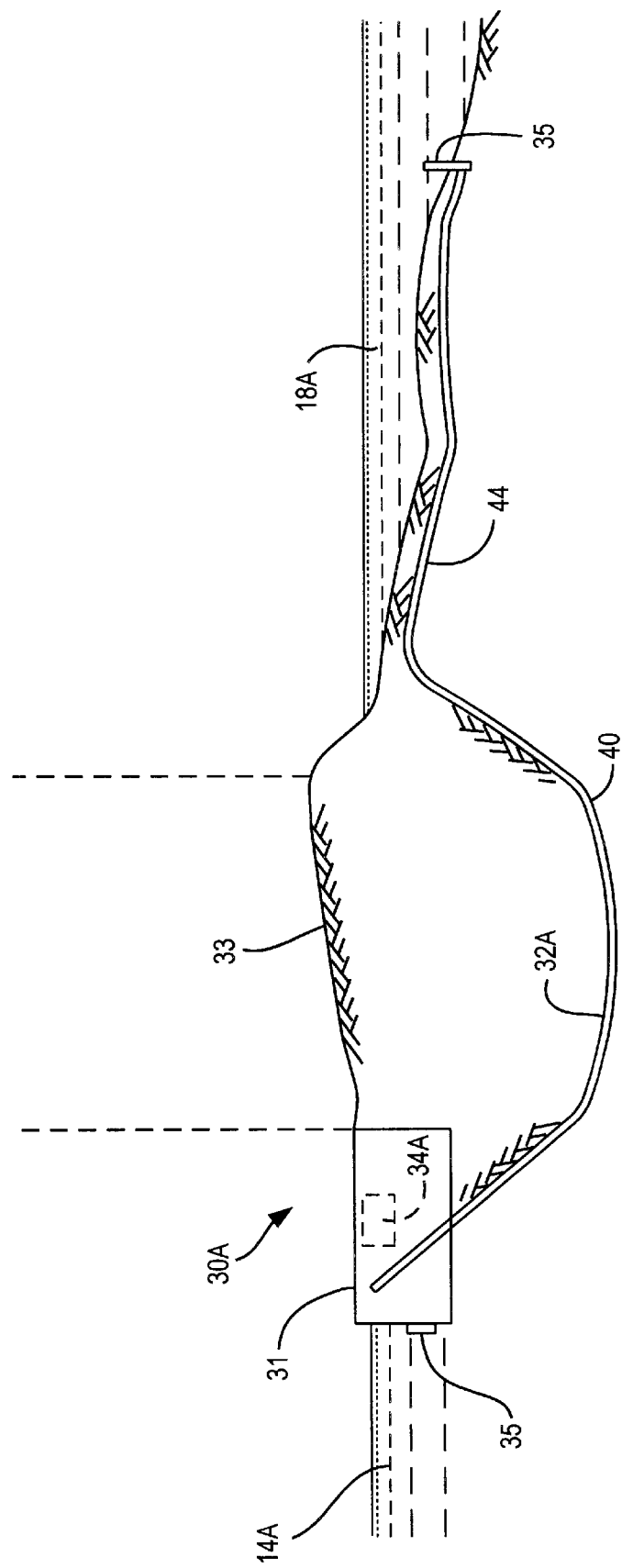
FIG. 4 depicts the water exchange system of FIG. 3 having a conduit installed by a combination of HDD and open-cut trench techniques.

Alternatively, a conduit may be installed by open-cut trench methods using barges and standard excavation equipment. Conduits through the barrier island and in the water bodies may be installed by combining HDD and open-cut trench methods to any desired diameter and total length. Referring to FIG. 4, the water quality management system of FIG. 3 is shown as having a conduit 32A formed by a combination of HDD and open-cut trench methods. As shown in FIG. 4, section 40 of conduit 32A is installed using HDD while section 44 is installed using open-cut trench methods.

Being installed in the marine environment for the sole purpose of conveying sea water, the conduit and terminal attachments and fitting will be continually subjected to the forces of corrosion, bio-fouling, sedimentation and stress factors of currents, wave action and vessel collision. Maintenance plans should address all conceivable concerns.

Corrosion and bio-fouling effects can be minimized by selection of materials developed specifically for the marine environment. In general, the material selected should resist the encrustation of barnacles, oysters, corals and sponges. Additionally, the selected material should be able to withstand the long-term effects of mechanical brushing by pipe cleaning pigs passing through the conduit and possible use of sonic and chemical cleansing procedures. The preferred HDD conduit material most probably will be high-density polyethylene (HDPE). However, steel, epoxy-coated steel or concrete may be used as the conduit material.

A pipe-cleaning pig design selection is an important aspect of the present invention. The pig should be neutrally buoyant and should be about six feet in length. The mid-section may be flexible to permit passage through the bend regions of the terminal fittings of the conduit 32. Eyelets are required on each end for the attachment of tethers used to return the pig to the estuary or embayment side of the HDD conduit and for aiding extraction should the pig become stuck in the conduit. The pig may feature a series of medium-stiff bristles (e.g., HDPE, steel) of varying lengths to facilitate brushing of the interior conduit wall. The pig may be optionally designed to release chemical cleaning agents (e.g., chlorine compounds, etc.) or support a sonic emitter to destroy calcareous bio-deposits on the pipe wall. Routine insertion/extraction/berthing of the pig is remote controlled through the computer management system. The pig is to traverse the conduit with each reversal of flow direction. Berthing should be free of contact with seawater to reduce bio-fouling over time.

Sedimentation can be minimized within the conduit by proper elevation positioning of the terminal fittings above the benthic zone of sediment/turbidity and maintaining internal flow velocities in excess of one foot per second to facilitate sand-water entrainment/transport through the conduit.

Stress factor effects can be minimized by providing fixed support structures to which flexible connectors are attached to the conduit terminal ends. Also, minimization of wave-action and vessel-impact damage can be achieved by providing shear couplings between the conduit terminal ends and the attached terminal fittings.

Alternatively, for continuous functionality and longevity, the HDD conduit can be constructed of a double-wall piping arrangement. With the passage of time and degrading of the interior pipe wall, the interior pipe can be extracted and a replacement pipe pulled through the primary crossing conduit. Although this option increases the diameter of the original crossing bore to accommodate a double-wall conduit, the replacement/repair cost and effort are greatly reduced.

Internal conduit inspection is facilitated both by a remote-operated camera-fitted submersible vessel and by human diver passage through the conduit.

For barrier islands that feature residential and commercial real estate, environmentally sensitive areas or extreme sloping land, the HDD operation will require water-to-water drilling technology. In this case, operations are based on a lift barge in the lagoon or shallow ocean shelf. Therefore, the HDD bore length is limited to less than 6,000 feet. Once the bore is completed, the casing is pulled through as one continuous pipe string. For casing diameters of 36 to 48 inches, a pull-back force of about one million pounds is required to complete the effort. An estimated two to three months are required to complete the water to water crossing by the HDD contractor.

Social considerations for the HDD installation include equipment noise, vibration and subsurface mounding and property rights. For these reasons, it is most desirable to align the bore under a public right-of-way whenever possible. Positioning the horizontal run under the island at a depth greater than 40 feet below sea level can minimize mounding and vibrational effects. Starting the bore more than 200 feet from the shoreline can minimize drilling rig noise heard by adjacent residents.

Environmental concerns during the HDD installation include minimization of turbidity during drilling, control of drilling fluids to prevent release to the marine surface waters and minimization of benthic habitat destruction. Release of bentonite during the waterside exit of the cutting head must be prevented by emplacement of silt screens and/or water suctioning during the exit moment with discharge water collected on a receiving barge.

To date, HDD technology has certain limitations: (1) the maximum diameter of the conduit that can be installed is 60 inches, I.D.; (2) the total length of the bore at the maximum diameter is less than 6,000 feet; (3) the width of the surf zone, as the ocean outlet of the conduit must extend beyond it to obtain clean, low turbidity seawater; and (4) the need to set the drilling barge platform and conduit inlet in the lagoon at the 3 feet low-tide depth contour to allow bi-directional water flow the majority of the time. When these four criteria are considered together, the fifth criteria becomes the width of the barrier island.

For most situations, the limitations are as follows:
1. Lagoon conduit opening set at a minimum of 200 feet from the shore of the barrier island in approximately 3 feet of water at low tide;
2. Ocean conduit opening set beyond the surf zone for waves less than 10 feet high, exiting at about 15 feet low-tide depth contour—usually about 1,000 feet from the beach;
3. A barrier island width less than 3,800 feet;
4. HDD total crossing length of approximately 5,000 feet to minimize drilling and conduit completion risks.

Of course, one overriding constraint that must be determined foremost is the geologic formation of the intended HDD bore path through the barrier island or land barrier. Such a geographic information system evaluation should be conducted for all barrier islands to which the water management system and method are applicable (e.g., barrier islands extending south from Maryland to Florida and west to Texas). The following layered maps are preferably used to identify priority project locations:

Geology of the barrier islands—formations are to be prioritized by a professional geologist;
Topographic map with lagoon-side 1 meter low-tide depth contour and ocean-side 5 meter low-tide depth contour, and, their respective linear distances from the shoreline;
Color-coded, barrier island width-zones in increments of 500 feet;
Street maps for aiding the location of HDD bore pathways; Satellite thermographic images for identification of land use Once the remote physical screening of the coastal zone is initiated, the next step is to conduct a review of estuarine water quality data and local news articles of priority sites. Estuaries or embayments that have a combination of a trend for decreasing salinity, increasing turbidity, increasing nutrient concentrations, disrupted fisheries and a local outcry for problem solution are ideal for application of the present invention. Sources of data include the EPA national STORET database, state environmental agencies and county environmental offices including media articles.

In an alternative embodiment, the application of the foregoing system and methodology of water quality management for estuaries, marinas, harbors and embayments may be adapted to provide filtration of large quantities of ocean water for conveyance to the estuary body of water. This adaptation may reduce or eliminate the need for installation of the conduit in the sea floor beyond the surf zone as shown in FIG. 2.

Figure 5:
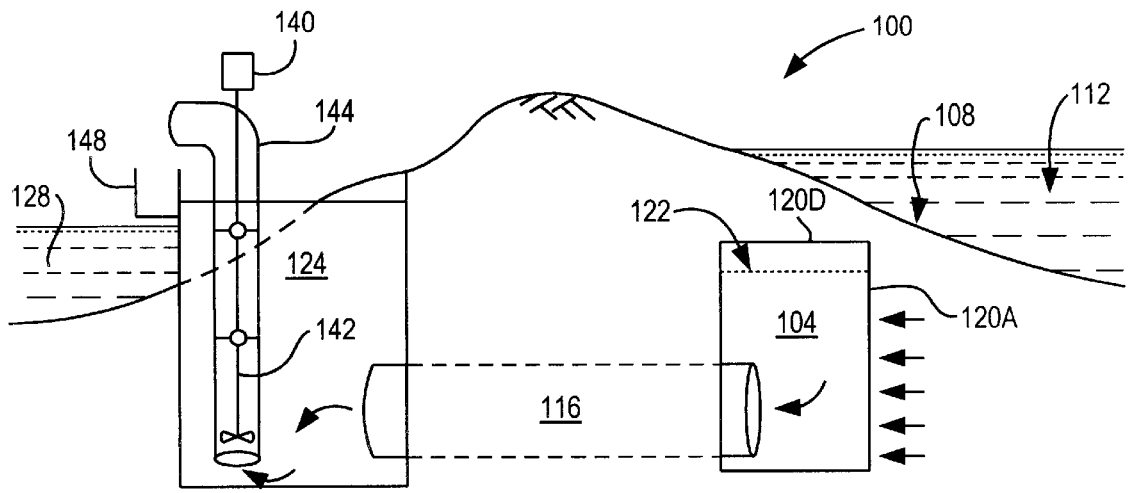
FIG. 5 is a cross-sectional view of an alternative embodiment of a water quality management system according to the present invention.
Figure 6:
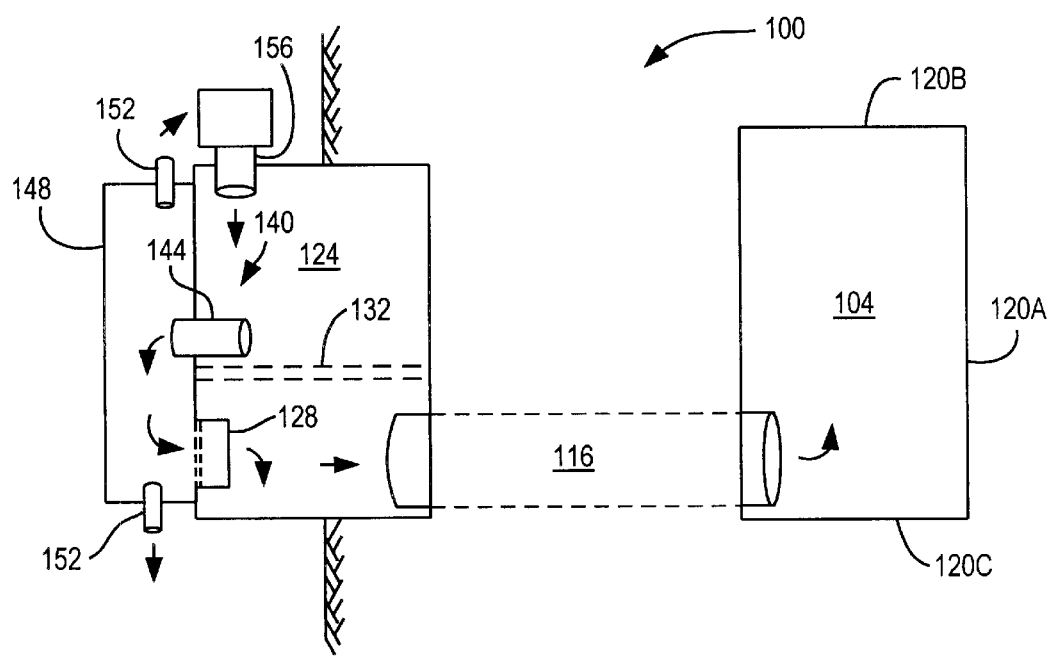
FIG. 6 is a top view thereof.

Referring to FIGS. 5 and 6, a water exchange system 100 according to an alternative exemplary embodiment is shown. The system 100 consists of a walled filter well or box 104 installed in the native beach sand 108 on the ocean-side 112 of a conveyance conduit 116. In this embodiment, the filter well or box 104 is constructed below the normal elevation range of native sand migration so as to maintain a minimum of approximately five feet of native sand above the top of the filter well 104 and also at an elevation to provide a minimum of approximately five feet of ocean water above the top of the filter well 104 at spring low tide level. The filter well or box 104 is constructed with a capacity as appropriate.

Referring further to FIG. 5, one or more walls 120A, 120B, 120C, 120D of the filter well or box 104 may be constructed of porous material to allow infiltration of ocean water in the direction of the arrows shown in FIG. 5. Filter material may include any of, or combinations of a metal fabric screen, perforated metal plate, manufactured porous block, filter fabric or size-graded filter rock bed or a combination of filter materials may be arranged in a configuration to effect ocean water filtration at a specified design infiltration rate. A filter support 122 may be provided.

Alternatively, the ocean-side filtering may be effected using one or a series of horizontal or vertical pipes with well screen capability installed into the beach sand at site-specific depths required to provide a predetermined design flow. The filtering pipes may be connected to a common header pipe for conducting flow to the pump sump located in the estuary body of water.

As further shown in FIGS. 5 and 6, the conduit 116 conveys filtered ocean water to a pump sump 124 located in the estuary body of water 128. As before, the conduit 116 may be installed below-grade and across the land barrier by HDD or by open-cut trench methods and may be made of HDPE, aluminum pipe, concrete pipe, steel or other material may be specified.

The conduit 116 enters the ocean-side filter well or box 104 near the bottom of the inland side of the filter device. The bottom elevation of the conduit 116 may be up to approximately 30 feet or more below mean low tide level thereby providing an adequate head of seawater to effect the required infiltration rate. Likewise, the conduit 116 is attached to the pump sump 124 near the bottom of the ocean-side wall.

The pump sump 124 may be constructed of treated lumber, metal sheet piles, concrete block or poured concrete. The sump 124 may be circular or rectangular in shape. The pump sump 124 may also be enclosed in a building or similar structure or exposed to the weather. The bottom of the sump 124 may be positioned at an elevation equal to or below the elevation of the ocean water filter device 104.

At the bottom of one wall of the pump sump 124 is a gated pipe 128 to allow the inflow of estuary water into the sump 124 as indicated by the flow arrows shown in FIG. 6. In addition, an adjustable sluice gate 132 may be arranged near the middle of the sump to isolate the conduit 116 connection from the pump 140 and estuary inflow pipe 144 (closed position for back flushing the ocean water filter device; open for discharge to the estuary).

The water exchange system 100 may utilize one or more of a variety of pumps (e.g., centrifugal, submersible, or impeller-type pumps). For example, the pump may utilize 250 hp electric motor with a 60,000 GPM impeller 142. The pump(s) 140 may be installed in the pump sump 124 or adjacent thereto. One or more additional pumps may be installed in the pump sump 124 to provide variable flow and or additional pump flow capacity.

As further shown in FIGS. 5 and 6, a spill box 148 is located at the top portion and on the exterior wall of the sump 124. The pump 140 discharges water into the spill box 148, which then may overflow into the estuary 128. A portion of the pump water may be directed out either end of the spill box 148 by gated or valved pipes or sluiceways 152 thereby permitting flow to occur in one, two, three or more directions. A sluice or pipe 156 may also installed into the spill box 148 which when in the ocean position allows pump flow waters to be diverted back into the pump sump 124 to aid the back flushing of the filter bed of the ocean water filter device. The top of the pump sump 124 may be fitted with a grated, perforated or solid flooring or plate to provide worker safety and to prevent wildlife from falling into the sump 124.

Like the previous embodiments, operation of the pump(s), gates, valves and/or sluices of the system 100 may be effected manually, automatically or by remote control with the aid of telemetry and software controls. Sensors may be located in the ocean, filter well or box, pump sump, estuary water and throughout the associated mainland watershed. These sensors may provide environmental and equipment status data to aid operational controls manually, remotely or automatically by computer software programs.

The filter bed of the ocean water-filtering device 104 may be maintained with the aid of additional back flushing systems. The external back flushing system may consist of a series of horizontal and/or vertical well points connected to a separate high-pressure pump. Well points may be located around the perimeter of the ocean water-filtering device and or underneath it. Pumped waters may receive chemical injection to further aid restoration of the filter bed materials. The back flushing system may be controlled manually, automatically or by remote controlled with the aid of telemetry and software controls.

In the process of filtering ocean water through porous media, marine fouling organisms are removed thereby reducing system cleaning and maintenance. Additionally, the filter well 104 protects marine species from being entrained in the exchange waters, which might in injury.

The water quality management system and method according to the any of the embodiments of the present invention can provide variable flow volumes and velocities, directed current flows from discharge to the estuary or embayment, and, bi-directional flow management of the conduit. Estuary or embayment temperature, salinity and water clarity can be regulated within certain predefined limits for optimization of biotic functionality. All this may be automatically achieved from a remote location.

Additionally, one or more of the water exchange units (as described above) may be replaced with known systems and methods for exchanging sea water between two bodies of water separated by a land barrier. Some examples include the provision of channels, trenches and canals for transporting water over a land barrier or barrier island rather than through the barrier island. As is also well known, culverts or conduits may be recessed in canals or waterways for carrying water to and from the estuary or embayment. These water exchange systems and methods may incorporate a pump assembly to induce water flow or may operate solely under the influence of natural tidal forces. Alternatively artificial heads may be created to induce greater water flow within these water exchange systems.

It will thus be seen that the objects set forth above, among those made apparent from the preceding description, are efficiently attained and, since certain changes may be made in carrying out the above method and in the system set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A water quality management system for exchanging water between two bodies of water at least partially separated by a barrier, comprising:

a water passage means extending between a first body of water and a second body of water, the water passage means having a first end in communication with the first body of water and a second end in communication with the second body of water;

a first water exchange unit disposed in the first body of water, the first water exchange unit including a pump unit for pumping water through the water passage means;

at least one sensor for sensing water conditions located in at least one of the first body of water and second body of water; and a remote station having means for communicating with the first water exchange unit and for controlling the operation of the first water exchange unit for regulating the flow of water between the first body of water and the second body of water.

2. The water quality management system of claim 1 further comprising at least one additional water exchange unit linked with the first water exchange unit and the remote station.

3. The water quality management system of claim 2, wherein said at least one additional exchange unit includes a sensor for sensing water conditions in the first body of water.

4. The water quality management system of claim 1 wherein communications between the first water exchange unit and the remote station is via at least one of a land-line and wireless communication means.

5. The water quality management system of claim 1 wherein the first water exchange unit includes a computer-controlled unit for controlling the pump unit and receiving data from the at least one sensor.

6. The water quality management system of claim 5 wherein the computer-controlled unit transmits the sensor data to the remote station via at least one of land-line and wireless communication means.

7. The water quality management system of claim 1 further comprising a filter well disposed at least partly within the second body of water, and wherein the second end of the water passage means is in fluid communication with the filter well.

8. The water quality management system of claim 1 wherein the water exchange unit further comprises a support platform mounted within the first body of water for supporting the pump unit.

9. The water quality management system of claim 8 wherein the first end of the water passage means extends to the support platform and is coupled to the pump unit for regulating the flow of water between the first body of water and the second body of water.

10. The water exchange unit of claim 8 wherein the support platform is constructed with vertical pilings anchored to the bottom of the first body of water.

11. The water quality management system of claim 1 wherein the water passage means is a conduit that extends through the barrier between the first body of water and the second body of water.

12. The water quality management system of claim 1 wherein the at least one sensor is mounted on the first water exchange unit.

13. The water quality management system of claim 1 wherein the at least one sensor comprises sensors located with the first body of water and second body of water for measuring at least one of tide height, salinity, conductivity, turbidity and temperature.

14. The water quality management system of claim 1 wherein the water passage means comprises a conduit and the second end of the conduit is connected to a diffuser pipe for the intake and discharge of water from and to the second body of water.

15. The water quality management system of claim 1 wherein the water passage means comprises a conduit and a riser having substantially the same diameter as the conduit extends from the second end of the conduit within the second body of water.

16. The water quality management system of claim 15 wherein the riser is connected to the conduit by means of a shear coupling to prevent damage to the conduit.

17. The water quality management system of claim 1 wherein the remote station may be used to control at least one of the pump unit speed to control velocity, the pump unit operation time, and pump unit shutdown.

18. The water quality management system of claim 17 wherein the remote station is at least one of operated directly by a human operator and accessed remotely.

19. The water quality management system of claim 1, wherein the pump unit comprises at least one of a reversible pump, a fixed pump, a retractable pump and a land-based pump.

20. A water quality management system for exchanging water between two bodies of water at least partially separated by a barrier, comprising a first water exchange unit disposed in a first body of water, said first water exchange unit including a pump unit, a water passage means extending between said first body of water and a second body of water, said water passage means having a first end in communication with said first body of water and a second end in communication with said second body of water, at least one sensor for sensing water conditions located in at least one of said first body of water and said second body of water, and a remote station having means for communicating with said first water exchange unit and for controlling the operation of said first water exchange unit for regulating the flow of water between said first body of water and said second body of water, said first water exchange unit further including a pump house located within said first body of water for housing said pump unit and said first end of said water passage means extending within said pump house.

21. A water quality management system for exchanging water between two bodies of water at least partially separated by a barrier, comprising a first water exchange unit disposed in a first body of water, said first water exchange unit including a pump unit, a water passage means extending between said first body of water and a second body of water, said water passage means having a first end in communication with said first body of water and a second end in communication with said second body of water, at least one sensor for sensing water conditions located in at least one of said first body of water and said second body of water, and a remote station having means for communicating with said first water exchange unit and for controlling the operation of said first water exchange unit for regulating the flow of water between said first body of water and said second body of water, said first water exchange unit further including a sump located within said first body of water and said first end of said water passage means extends within said sump for carrying into said sump water from said second body of water.

22. The water quality management system of claim 21 wherein the sump includes an inflow pipe connected to the pump unit to draw water from the sump into a spill box and out into the first body of water.

23. A water quality management system for exchanging water between two bodies of water at least partially separated by a land barrier, comprising:
    at least one water exchange unit disposed in a first body of water, the water exchange unit including a support platform positioned in the first body of water and a pump unit for pumping water between the first body of water and second body of water;
    a water passage means extending through the land barrier between the first body of water and the second body of water for carrying water between the first body of water and the second body of water, the water passage means having a first end located within the first body of water and coupled to the water exchange unit and a second end located within the second body of water; and
    a sensor array for sensing water quality conditions, the sensor array generating data representative of the water quality conditions, wherein the data representative of water quality conditions is used to control the water exchange unit for regulating the flow of water between the first body of water and the second body of water.

24. The water quality management system of claim 23 further comprising a central control station for remotely controlling the operation of the water exchange unit.

25. The water quality management system of claim 23 wherein the water exchange unit further comprising a computer-controlled unit coupled to the pump unit and sensor array for controlling the pump unit and receiving the data from the sensor array.

26. The water quality management system of claim 25 wherein the computer-controlled unit transmits the sensor array data to a remote central control station via at least one of land-line and wireless communication means.

27. The water quality management system of claim 23 further comprising a riser coupled to the second end.

28. The water quality management system of claim 23 wherein the water passage means comprises a conduit and the second end of the conduit is connected to a diffuser pipe for the intake and discharge of water from and to the second body of water.

29. The water quality management system of claim 27 further comprising a shear coupling for connecting the riser to the second end.

30. The water quality management system of claim 23 wherein the pump unit comprises at least one of a reversible pump, a fixed pump and a retractable pump.

31. The water quality management system of claim 23 wherein the sensor array comprises probes mounted to the platform for measuring at least one of tide height, salinity, conductivity, turbidity and temperature.

32. A water quality management system for exchanging water between two bodies of water at least partially separated by a land barrier comprising:
   at least one water exchange unit disposed in a first body of water, the water exchange unit including a pump house positioned in the first body of water and a pump unit for assisting in the exchange of water between the first body of water and the second body of water;
   a water passage means extending through the land barrier between the first body of water and the second body of water for carrying water between the first body of water and the second body of water, the water passage means having a first end in communication with the pump house and coupled to the pump unit and a second end located within the second body of water;
   and a sensor array for sensing water quality conditions, the sensor array generating data representative of the water quality conditions, wherein the data representative of water quality conditions is used to control the water exchange unit for regulating the flow of water between the first body of water and the second body of water.

33. The water quality management system of claim 32 further comprising a central control station for remotely controlling the operation of the water exchange unit.

34. The water quality management system of claim 32 wherein the water exchange unit further comprising a computer-controlled unit coupled to the pump unit and sensor array for controlling the pump unit and receiving the data from the sensor array.

35. The water quality management system of claim 34 wherein the computer-controlled unit transmits the sensor array data to a remote central control station via at least one of land-line and wireless communication means.

36. The water quality management system of claim 32 further comprising a riser coupled to the second end of the water passage means.

37. The water quality management system of claim 36 further comprising a shear coupling for connecting the riser to the second end.

38. The water quality management system of claim 32 wherein the water passage means comprises a conduit and the second end of the conduit is connected to a diffuser pipe for the intake and discharge of water from and to the second body of water.

39. The water quality management system of claim 32 wherein the pump unit comprises at least one of a reversible pump, fixed pump and a retractable pump.

40. The water quality management system of claim 32 wherein the sensor array comprises probes mounted to the platform for measuring at least one of tide height, salinity, conductivity, turbidity and temperature.

41. A water quality management system for exchanging water between two bodies of water at least partially separated by a land barrier comprising:
   a water exchange unit disposed in a first body of water, the water exchange unit including a sump disposed within at least a portion of the first body of water and a pump unit for assisting in the exchange of water between the first body of water and second body of water;
   a filter well disposed within the second body of water, the filter well including at least one wall of porous media for filtering water passing through the porous media thereby reducing system cleaning and maintenance;
   a water passage means extending through the land barrier between the first body of water and the second body of water for carrying water between the first body of water and the second body of water, the water passage means having a first end extending at least partly within the sump for discharging water within the sump and a second end extending at least partly within the filter well; and
   a sensor array for sensing water quality conditions, the sensor array generating data representative of the water quality conditions, wherein the data representative of water quality conditions is used to control the water exchange unit for regulating the flow of water between the first body of water and the second body of water.

42. The water quality management system of claim 41 further comprising a central control station for remotely controlling the operation of the water exchange unit.

43. The water quality management system of claim 41 wherein the water exchange unit further comprising a computer-controlled unit coupled to the pump unit and sensor array for controlling the pump unit and receiving the data from the sensor array.

44. The water quality management system of claim 43 wherein the computer-controlled unit transmits the sensor array data to a remote central control station via at least one of land-line and wireless communication means.

45. The water quality management system of claim 41 further comprising a riser coupled to the first end of the water passage means.

46. The water quality management system of claim 41 wherein the pump unit comprises at least one of a reversible pump, fixed pump and a retractable pump.

47. The water quality management system of claim 41 wherein the sensor array comprises probes mounted to the platform for measuring at least one of tide height, salinity, conductivity, turbidity and temperature.

48. A method for managing the quality of water in a first body of water separated from a second body of water by a land barrier comprising the steps of:
   installing a water passage means within a land barrier between a first body of water and a second body of water such that a first end of the water passage means extends within the first body of water and a second end of the water passage means extends within the second body of water;
   positioning a water exchange unit within the first body of water, said water exchange unit including a pump unit for pumping water through the water passage means;
   installing at least one sensor within the first body of water for generating data representative of water quality condition; and
   using the sensor data to control the operation of the pump unit for regulating the flow of water between the first body of water and the second body of water.

49. The method for managing the quality of water of claim 48 wherein the water passage means is installed using at least one of a horizontal directional drilling technique and an open-cut trench technique.

50. The method for managing the quality of water of claim 48 wherein the second body of water is the ocean and the second end of the water passage means is installed beyond the surf zone of the ocean.

51. The method for managing the quality of water of claim 48 wherein the water passage means is constructed using material selected from one of high-density polyethylene, aluminum, concrete and steel.

52. The for managing the quality of water of claim of claim 48 wherein the sensor data is transmitted to a central control station via at least one of a land-line or wireless communication means for remote operation of the water exchange unit.

53. The method for managing the quality of water of claim 48 wherein the water exchange unit is programmed to enter a neutral mode thereby operating as a mini-inlet with water flow between the first body of water and the second body of water actuated by natural tidal rhythms.

54. A method for managing the quality of water in a first body of water separated from a second body of water by a land barrier, comprising the steps of positioning a water exchange unit including a pump unit within a first body of water;

installing water passage means within a land barrier between said first body of water and a second body of water such that a first end of said water passage means extends within said first body of water and a second end of said water passage means extends within said second body of water, said first end extending within a pump house positioned within said first body of water;

installing at least one sensor within said first body of water for generating data representative of water quality condition; and using said sensor data to control the operation of said pump unit for regulating the flow of water between said first body of water and said second body of water.

55. A method for managing the quality of water in a first body of water separated from a second body of water by a land barrier, comprising the steps of positioning a water exchange unit including a pump unit within a first body of water;

installing water passage means within a land barrier between said first body of water and a second body of water such that a first end of said water passage means extends within said first body of water and a second end of said water passage means extends within said second body of water, said first end extending within a sump positioned within said first body of water and said second end extending within a filter well within said second body of water, said filter well including at least one wall of porous media to permit the filtered infiltration of water from said second body of water;

installing at least one sensor within said first body of water for generating data representative of water quality condition; and using said sensor data to control the operation of said pump unit for regulating the flow of water between said first body of water and said second body of water.

* * * * *